(12) United States Patent
Kim et al.

(10) Patent No.: US 9,991,786 B2
(45) Date of Patent: Jun. 5, 2018

(54) POWER CONTROL DEVICE AND METHOD THEREOF

(71) Applicant: SK hynix Inc., Icheon-si, Gyeonggi-do (KR)

(72) Inventors: Jong Sam Kim, Cheongju-si (KR); Jong Yeol Yang, Seoul (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 137 days.

(21) Appl. No.: 14/886,375

(22) Filed: Oct. 19, 2015

(65) Prior Publication Data
US 2017/0019018 A1    Jan. 19, 2017

(30) Foreign Application Priority Data
Jul. 13, 2015    (KR) .................. 10-2015-0099297

(51) Int. Cl.
*G06F 1/32* (2006.01)
*H02M 1/36* (2007.01)
*H02M 3/07* (2006.01)

(52) U.S. Cl.
CPC ............... *H02M 1/36* (2013.01); *G06F 1/32* (2013.01); *H02M 3/07* (2013.01)

(58) Field of Classification Search
CPC .................................... G06F 1/32; G06F 1/28
USPC ....... 713/700, 710, 720, 721, 722, 723, 724, 713/30, 735, 740, 780
See application file for complete search history.

(56) References Cited

U.S. PATENT DOCUMENTS

| | | | |
|---|---|---|---|
| 6,118,325 A | 9/2000 | Nakamura | |
| 6,294,948 B1 * | 9/2001 | Blodgett | H02M 3/073 327/536 |
| 2008/0224752 A1 * | 9/2008 | Lee | G06F 1/3203 327/292 |
| 2014/0145766 A1 * | 5/2014 | Lee | H03K 17/223 327/143 |
| 2015/0006926 A1 | 1/2015 | Hong | |
| 2015/0019853 A1 * | 1/2015 | Hong | H04L 49/40 713/2 |

* cited by examiner

*Primary Examiner* — Jaweed A Abbaszadeh
*Assistant Examiner* — Keshab Pandey
(74) *Attorney, Agent, or Firm* — William Park & Associates Ltd.

(57) ABSTRACT

An embodiment relates to a power control device and a technology capable of stably supplying power when an electrical fuse boots up. The power control device includes a power supply unit, a power driving unit, and an electrical fuse unit. The power supply unit generates a driving signal from a power supply voltage when a control signal is activated. The power driving unit outputs the driving signal when the control signal is activated. The electrical fuse unit generates, when a boot-up enable signal is activated, a clock signal by performing a boot-up operation in response to the driving signal outputted from the power driving unit.

20 Claims, 4 Drawing Sheets

POWER CONTROL DEVICE AND METHOD THEREOF

CROSS-REFERENCE TO RELATED APPLICATION

The present application claims priority under 35 U.S.C. § 119(a) to Korean application number 10-2015-0099297 filed on Jul. 13, 2015, in the Korean Intellectual Property Office, which is incorporated herein by reference in its entirety.

BACKGROUND

1. Technical Field

Various embodiments generally relate to an integrated circuit, and more particularly to a power control device and method for achieving a stable power supply.

2. Related Art

A field-effect transistor has a threshold voltage (hereinafter referred to as "VT"), which means the minimum gate-to-source voltage differential that is needed to create a current path between the source and drain. In general, a semiconductor device such as DRAM requires an external power source VDD higher than 2VT, that is, a stable operation of the semiconductor device requires an external power source VDD higher the sum of the threshold voltages of PMOS and NMOS transistors used in the DRAM.

A semiconductor device, which is powered by an external power source VDD, may have a power-up signal generator for generating a power-up signal PWRUP. The power-up signal PWRUP is a signal that notifies the semiconductor device or its peripheral devices of having reached a voltage level required for the semiconductor device.

For instance, after an external power source VDD is applied, the power-up signal generator outputs a logic low signal as the power-up signal PWRUP until a voltage level of the semiconductor device reaches a predetermined target voltage level, and generates a logic low signal as the power-up signal PWRUP after the voltage level of the semiconductor device has reached the predetermined target voltage level and stabilized.

Normal operating conditions with respect to various internal circuits of the semiconductor device may be secured with such a sufficient, stabilized voltage level, which can be checked by the power-up signal PWRUP.

SUMMARY

Various embodiments are directed to the stable supply of a driving voltage in an initial boot-up operation using an external power source.

In an embodiment, a power control device includes a power supply unit configured to generate a driving signal from a power supply voltage when a control signal is activated, a power driving unit configured to output the driving signal when the control signal is activated, and an electrically fuse unit configured to, when a boot-up enable signal is activated, generate a clock signal by performing a boot-up operation in response to the driving signal outputted from the power driving unit, In an embodiment, a power control method includes activating a control signal after a certain period of time since a power-up signal is activated, activating a boot-up enable signal for booting up an and electrical fuse unit, turning on a power supply unit and a power driving unit when the control signal is activated so that a driving signal for driving the electrical fuse unit is driven with a level of a power supply voltage, and turning on the power supply unit and the power driving unit when the control signal is deactivated so that the driving signal is driven with a lower level than the power supply voltage.

DETAILED DESCRIPTION

Hereinafter, a power control device and method will be described below with reference to the accompanying drawings through various examples of embodiments.

Figure 1:
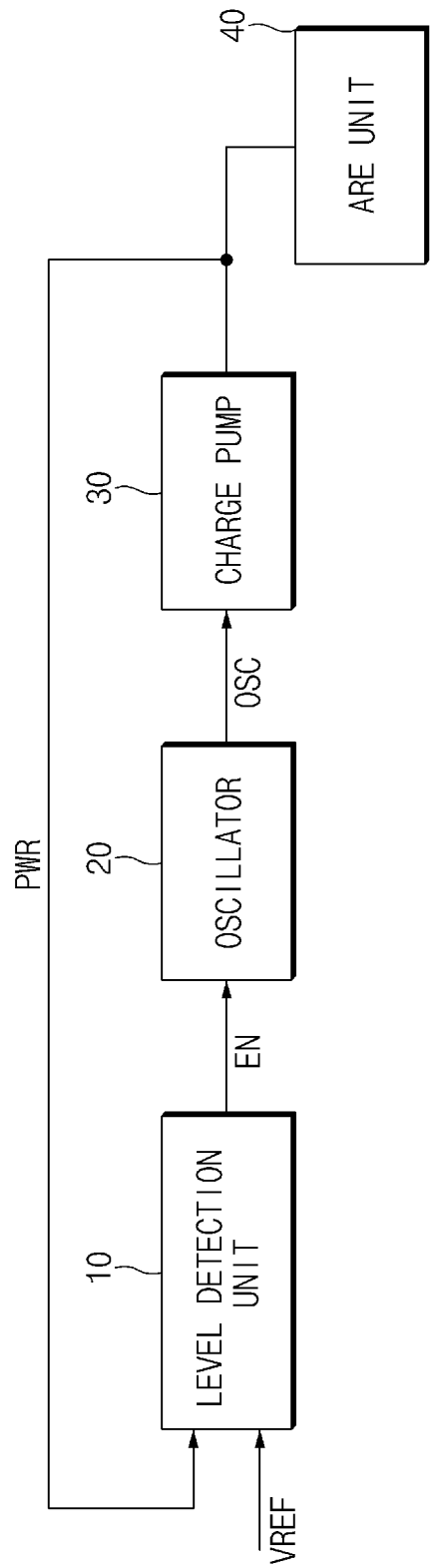
FIG. 1 is a configuration diagram regarding a power control device.

FIG. 1 is a configuration diagram regarding a power control device.

The power control device may include a level detection unit 10, an oscillator 20, a charge pump 30, and an array E-fuse (hereinafter referred to as "ARE") unit 40.

A semiconductor memory device requires a variety of internal voltages having different voltage levels. These internal voltages, which are applied to various types of internal circuits depending on their purposes, are generated by using an external power source. Some of the internal voltages may be generated by stepping down the voltage of external power source, and the others having a voltage level higher than the voltage of the external power source may be generated by using a charge pump.

When a power-up operation is performed, the power control device compares a voltage level of a driving signal PWR with that of a reference voltage VREF. Furthermore, the power control device generates the driving signal PWR having a voltage level corresponding to a level of the reference voltage VREF by pumping up a power supply voltage VDD based on a result of the comparison.

In an embodiment, the power supply voltage VDD may correspond to a voltage applied from an external power source, and the driving signal PWR may have a level of a driving voltage for driving the ARE unit 40.

When a power-up operation is performed, the level detection unit 10 receives, from outside of the semiconductor memory device, the reference voltage VREF that is identical to a target voltage level of the driving signal PWR. The level detection unit 10 compares a voltage level of the driving signal PWR that has been back from the charge pump 30 (e.g., the driving signal PWR at the point in time when the level detection unit 10 performs the voltage comparison) with the level of the reference voltage VREF and outputs an enable signal EN based on a result of the comparison. In this case, the enable signal EN may have an active state (e.g., a logic high level) when the voltage level of the driving signal PWR is lower than the level of the reference voltage VREF.

When the enable signal EN has an active state, the oscillator 20 generates a specific cycle signal OSC. In an embodiment, the oscillator 20 may include a ring oscillator.

The charge pump 30 generates the driving signal PWR by stepping up the voltage level from the power supply voltage VDD in response to the cycle signal OSC.

Although highly integrated semiconductor memory devices use a low operating voltage, their power consumption may increase due to the increase in the number of memory cells therein. Therefore, the efforts to develop a low-power semiconductor memory device led to the development in power-saving techniques like a deep power-down mode.

The ARE unit 40 may include a plurality of electrical fuses. In an embodiment, the electrical fuses may include an ARE. After a voltage of an external power source VDD starts to be applied, the semiconductor memory device carries out a boot-up operation. The semiconductor memory device starts to perform a power-up operation, read repair information from the ARE included in the ARE unit 40, and store the repair information in an internal latch.

After the boot-up operation is completed, the semiconductor memory device refers to the repair information for an address substitution. In a case where metal fuses are used for storing repair information repair information may be automatically read from the metal fuses and stored in a latch depending on whether the metal fuse has been blown or not.

In the case where ARE is used for storing rapair information, however, repair information must be read from the ARE and stored in a latch during the boot-up operation. Accordingly, as the capacity of memory increases, the amount of fuse information to be read during the boot-up operation is greatly increased, and reading such a large amount of information may cause instability in an internal driving signal.

When the ARE unit 40 operates using the driving signal PWR as an internal driving signal, the boot-up operation of the ARE unit 40 may not be stably performed if the driving signal PWR, which is an internal driving signal generated by pumping up the power supply voltage VDD, may become unstable.

That is, if the internal voltage is maintained within a target voltage range during the boot-up operation, the boot-up operation may be stably performed. If the internal voltage becomes unstable, however, the boot-up operation is not properly performed.

If the internal voltage is unstable, correct repair information may not be read from the ARE nor may correct repair information be stored in a latch even if correct repair information have been read from the ARE.

Figure 2:
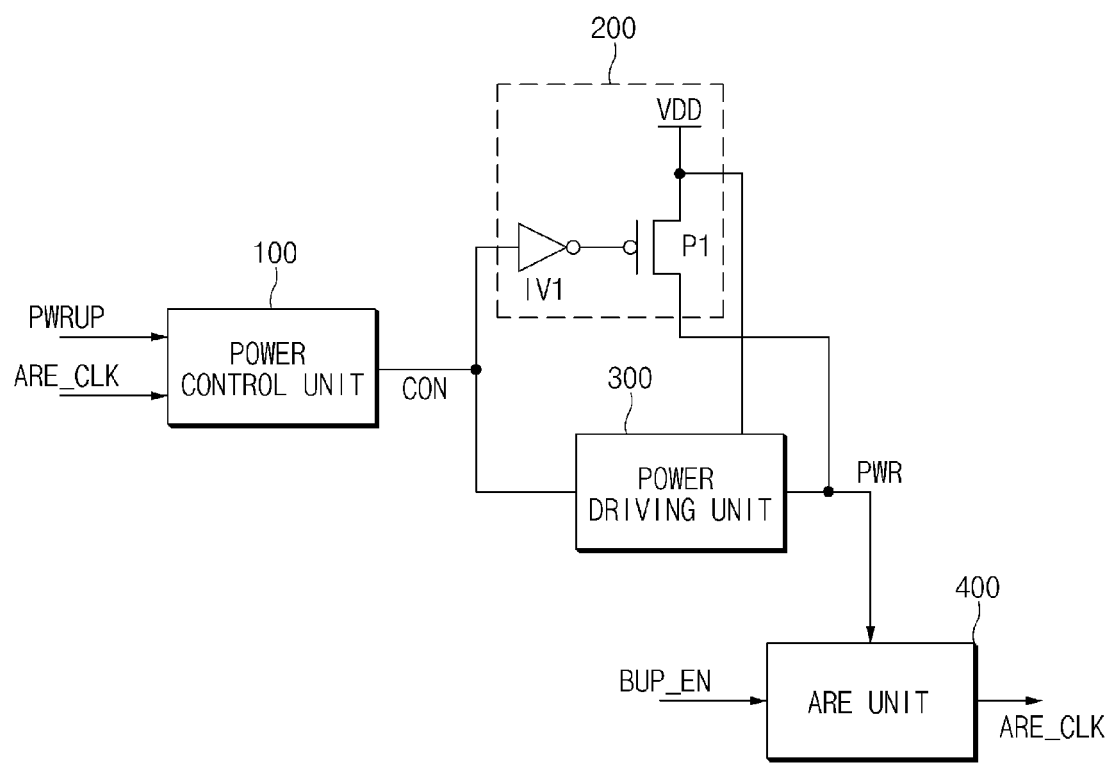
FIG. 2 a diagram showing an example configuration of a power control device according to an embodiment.

FIG. 2 a diagram showing an example configuration of a power control device according to an embodiment.

The power control device may include a power control unit 100, a power supply unit 200, a power driving unit 300, and an ARE unit 400.

The power control unit 100 generates a control signal CON for controlling a power source in response to a power-up signal PWRUP and an ARE clock ARE_CLK. The power-up signal PWRUP is a trigger signal generated in response to a level of a used power source.

That is, when the power-up signal PWRUP is active, the control signal CON is activated for a certain period of time, and the power supply unit 200 is turned on. After a certain period of time has elapsed since the ARE clock ARE_CLK was activated, the control signal CON is deactivated, and the power supply unit 200 becomes turned off.

The power supply unit 200 controls a voltage level of a driving signal PWR in response to the control signal CON so that the driving signal PWR has a voltage level corresponding to the level of a power supply voltage VDD. That is, when the control signal CON is in an active state, the power supply unit 200 is turned on to drive the driving signal PWR to the level of the power supply voltage VDD and applies, to the ARE unit 400, the driving signal PWR having the level of the power supply voltage VDD. In contrast, when the control signal CON is deactivated, the power supply unit 200 is turned off to block the supply of the power supply voltage VDD.

The power supply unit 200 may include an inverter IV1, and a PMOS transistor P1 as a pull-up driving element. The PMOS transistor P1 is coupled between a terminal for applying the power supply voltage VDD and a terminal for outputting the driving signal PWR, and thus the control signal CON inverted by the inverter IV1 is applied to the gate terminal of the PMOS transistor P1.

The power driving unit 300 starts an operation when the control signal CON is activated. The power driving unit 300 drives the power supply voltage VDD and applies, to the ARE unit 400, the driving signal PWR having a lower voltage level than the power supply voltage VDD. In an embodiment, the power driving unit 300 may include a low drop output (hereinafter referred to as "LDO") regulator for lowering a voltage level.

When the boot-up enable signal BUP_EN is activated, the ARE unit 400 performs a boot-up operation in response to the driving signal PWR and outputs the ARE clock ARE_CLK. In this case, the ARE clock ARE_CLK may be a clock signal that is inputted in synchronization with data being outputted from ARE when the boot-up operation is performed. A boot-up enable signal BUP_EN is a signal that becomes active (e.g. logic high level) when the power-up signal PWRUP transitions from logic low level to logic high level, and the power supply voltage VDD reaches a target level.

The ARE unit 400 stores failure information. Information on addresses where failures have occurred during a memory test may be temporarily stored in a storage device in a memory tester. The information may be provided to the semiconductor memory device, and then E-fuses corresponding to the failure-occurred addresses are ruptured to permanently store the failure information.

As the size of a semiconductor integrated circuit decrease, and the number of transistors and other parts of the circuit included in a single semiconductor chip increases, its defect density also increases. An increase in the defect density may cause deterioration in device performance, which may result in low yields.

In order to reduce the defect density, a redundancy circuit for replacing a defective cell/row/column with a redundant cell/row/column may be used. The redundancy circuit (e.g., fuse circuit) may include redundant rows (e.g., redundant word lines) and redundant columns (e.g., redundant bit lines).

The redundancy circuit may include the ARE unit 400 for storing failure information on addresses where failures have occurred. The ARE unit 400 may include a plurality of fuse sets, each of which includes a plurality of fuse lines. The ARE unit 400 is a type of memory in which the failure information may be stored. The ARE unit 400 selects a row line corresponding to the failure information (e.g., an address where a failure has occurred).

Each of the fuse sets may store information by melting a fuse using an overcurrent. Furthermore, each of the fuse sets may perform self-repair in order to repair a bit-failure in the package state of the semiconductor memory.

The ARE unit 400 may store the failure information by rupturing E-fuses corresponding to addresses where failures have occurred.

The ARE unit 400 controls the rupture of the E-fuses in response to a rupture enable signal applied to an ARE control unit. When the rupture enable signal is activated, the ARE unit 400 stores the failure-occurred addresses. In contrast, when the rupture enable signal is deactivated, the ARE unit 400 does not perform a rupture operation. Each fuse set may include an E-fuse for programming information by melting the E-fuse using an overcurrent.

Figure 3:
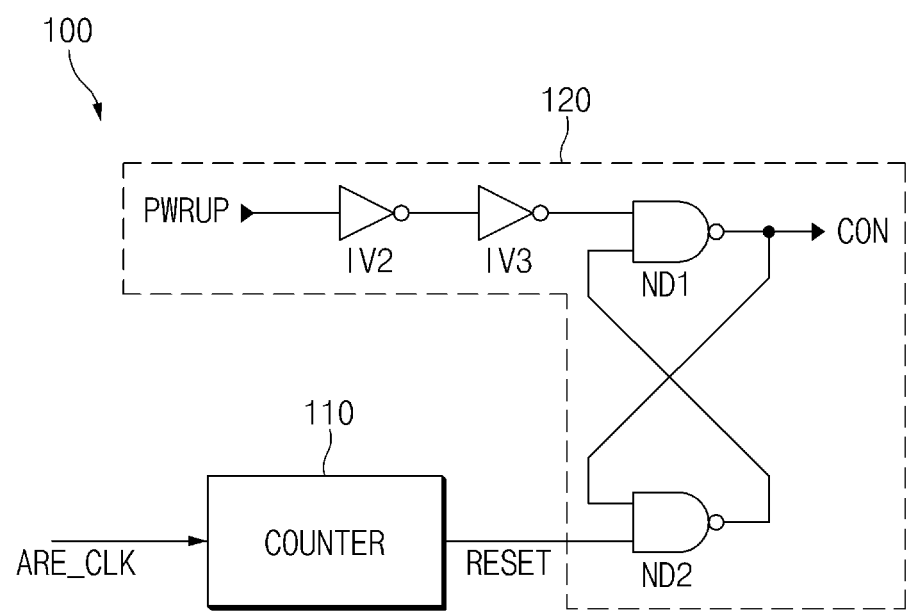
FIG. 3 is a detailed circuit diagram regarding a power control unit of FIG. 2.

FIG. 3 is a detailed circuit diagram regarding the power control unit 100 of FIG. 2.

The power control unit 100 may include a counter 110 and a latch unit 120.

The counter 110 generate a reset signal RESET by counting the ARE clock ARE_CLK. If the ARE clock ARE_CLK toggles a set number of times, the counter 110 activates a reset signal RESET.

Furthermore, when the power-up signal PWRUP is activated, the latch unit 120 stores the power-up signal PWRUP and generates the control signal CON. When the power-up signal PWRUP is activated to a high level, the latch unit 120 stores the control signal CON having a logic high level. Furthermore, when the reset signal RESET is activated, the latch unit 120 shifts the control signal CON to a low level.

The latch unit 120 may include a plurality of inverters IV2 and IV3 and a plurality of NAND gates ND1 and ND2. The inverters IV2 and IV3 delay the power-up signal PWRUP without inverting the power-up signal PWRUP. The NAND gate ND1 outputs the control signal CON by performing NAND operation on output signals of the inverter IV3 and the NAND gate ND2. The NAND gate ND2 performs NAND operation on the reset signal RESET and the control signal CON and outputs a result of the NAND operation to the NAND gate ND1.

Figure 4:
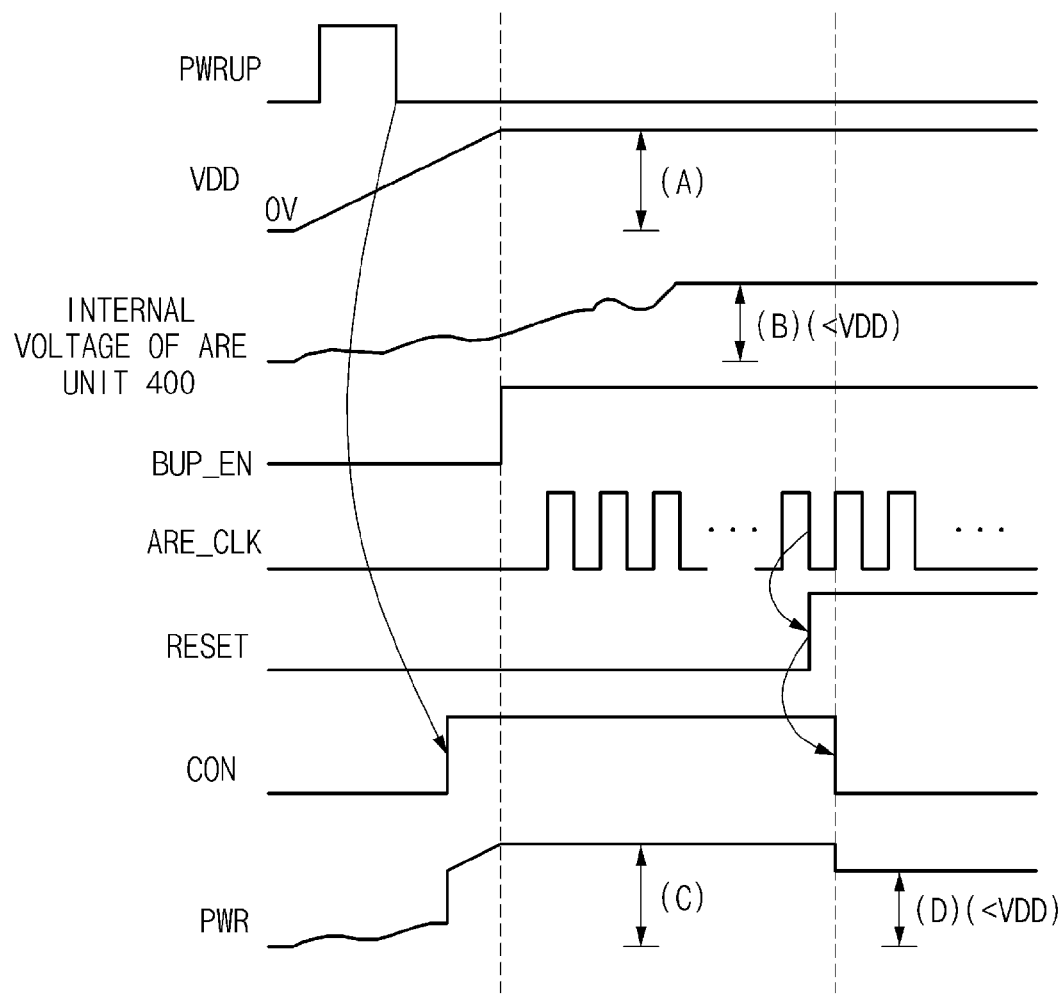
FIG. 4 is an operation timing diagram illustrating a power control method according to an embodiment.

FIG. 4 is an operation timing diagram illustrating a power control method according to an embodiment.

First, when the power-up signal PWRUP is activated to a logic high level, the voltage level of an external power supply voltage VDD starts to increase. After a certain period of time has elapsed, the external power supply voltage VDD reaches a stable voltage level A. Here, a target voltage level of the voltage level A is a level of the external power supply voltage VDD.

At this time, the ARE clock ARE_CLK is not generated because the boot-up enable signal BUP_EN maintains a low level, and thus the ARE unit 400 does not operate. Furthermore, since the control signal CON has a logic low level, the power supply unit 200 and the power driving unit 300 maintain a turned-off state. Accordingly, the driving signal PWR supplied to the ARE unit 400 also maintains a low level.

Thereafter, if the power-up signal PWRUP transitions from logic high level to logic low level, the control signal CON is activated to a high level. Accordingly, the power driving unit 300 operates in response to the power supply voltage VDD, the power supply unit 200 is turned on, and the voltage level of the driving signal PWR starts to rise.

When the control signal CON is activated, both the power driving unit 300 and the power supply unit 200 may operate. Even if the supply of the external power source voltage VDD is suddenly blocked, and the operation of the power supply unit 200 is turned off, the boot-up operation of the ARE unit 400 may be normally performed because the power driving unit 300 maintains the operation state.

Thereafter, after the boot-up enable signal BUT_EN is activated to a high level, the boot-up operation of the ARE unit 400 is started, and then the ARE clock ARE_CLK of the ARE unit 400 starts to toggle.

If only the power driving unit 300 operates when the boot-up operation of the ARE unit 400 is initially performed, an internal voltage of the ARE unit 400 increases slowly because the level of the internal voltage is unstable. Reference character "B" in the FIG. 4 shows that how much time is taken for the level of an internal voltage to reach the target voltage level. Here, the target voltage level B is lower than the level of the power supply voltage VDD.

In an embodiment, however, when the control signal CON is activated, both the power driving unit 300 and the power supply unit 200 operate. Accordingly, when the initial boot-up operation is performed, the voltage level of the driving signal PWR reaches the level of the power supply voltage VDD as indicted by "C."

Next, the counter 110 generate a reset signal RESET by counting the number of ARE clocks ARE_CLK that toggles. That is, when the number of cycles of ARE clocks ARE_CLK is a predetermined number, the counter 110 activates the reset signal RESET.

When the reset signal RESET is activated, the control signal CON transitions from logic high level to logic low level, and the power supply unit 200 becomes turned-off, and only the power driving unit 300 operates. Accordingly, the voltage level of the driving signal PWR is lowered, and the driving signal PWR having a lower voltage level than the power supply voltage VDD is supplied to the ARE unit 400 as indicated by "D."

If the ARE unit 400 uses an internal voltage as its driving voltage, the internal voltage must be stabilized at least until the ARE unit 400 starts to operate (e.g., a point in time when boot-up is performed). Accordingly, the internal voltage supplied to the ARE unit 400 may be driven at a point in time when the power-up signal PWRUP is activated, may be driven while the power-up signal PWRUP is activated, or may be driven after the power-up signal PWRUP is deactivated.

Furthermore, the internal voltage supplied to the ARE unit 400 may be driven simultaneously with a boot-up operation. If the internal voltage supplied to the ARE unit 400 is driven simultaneously with the boot-up operation, however, the boot-up operation may not start normally due to the time taken to stabilize the internal voltage. For this reason, the internal voltage may be driven at the point in time when the power-up signal PWRUP is activated or may be driven while the power-up signal PWRUP is activated.

When the boot-up operation of the ARE unit 400 is started, electric current used therein may increase, and thus the power driving unit 300 may use an LDO regulator therein to maintain a stable voltage level. A power driving unit 300 that has a weak driving force may be helpful to reduce a total standby current of a semiconductor chip, whereas it may be difficult to handle the load caused by the current being consumed by the initial boot-up operation.

In order to prevent such a problem, the power driving unit 300 may include an LDO regulator having a great driving force. In this case, the power driving unit 300 does not operate before the boot-up circuit of the ARE unit 400 actually operates.

Furthermore, even if a boot-up operation is performed, and a current is consumed when the boot-up enable signal BUP_EN is activated, a driving response time is required to detect the voltage level of the power driving unit 300.

If the ARE unit 400 is driven by the external power supply voltage VDD, the driving response time does not need to be taken into consideration. If the ARE unit 400 is driven by an internal voltage, however, data may not be normally transferred to a latch due to the driving response time when the initial boot-up operation of the ARE unit 400 is performed.

In order to prevent such a problem, in an embodiment, during a predetermined period of time while the initial boot-up operation is being performed, the external power supply voltage VDD is supplied for the ARE unit 400, and the power driving unit 300 having a great driving force is driven.

After the predetermined period of time, the supply of the external power supply voltage VDD is blocked, and the ARE unit 400 is driven by an internal voltage of the power driving unit 300 having a lower voltage level than the external power supply voltage VDD. Accordingly, when the initial boot-up operation is performed, the ARE unit 400 may receive a stable power supply, and thus a boot-up operation is normally performed.

In an embodiment, a stable driving power can be supplied by using an external power source voltage when an initial boot-up operation is performed.

While various embodiments have been described above, it will be understood to those skilled in the art that the embodiments described are by way of example only. Accordingly, the device and method described herein should not be limited based on the described embodiments.

What is claimed is:

1. A power control device, comprising:
   a power control circuit configured to activate a control signal for a predetermined period of time after a power-up signal is activated
   a power supply circuit configured to generate a first driving voltage which is substantially the same as a power supply voltage while the control signal is activated;
   a power driving circuit configured to output a second driving voltage which is lower than the power supply voltage;
   an electrical fuse circuit configured to, when a boot-up enable signal is activated, be driven by the driving voltages and generate a clock signal for performing a boot-up operation, wherein the first driving voltage is substantially the same as the power supply voltage while the control signal is activated and the second driving voltage is lower than the power supply voltage after the control signal transitions from an activated state to a deactivated state.

2. The power control device of claim 1, wherein:
   when the control signal starts to be activated, both the power supply circuit and the power driving circuit are turned on; and
   when the control signal becomes deactivated from the activated state, the power supply circuit is turned off and the power driving circuit maintains the turned-on state.

3. The power control device of claim 1, wherein, when the power supply voltage reaches a predetermined target level after a power-up operation, the boot-up enable signal is activated.

4. The power control device of claim 1, wherein, when the boot-up enable signal is activated, the driving voltages are supplied with the level of the power supply voltage for a certain period of time and supplied with a lower level than the power supply voltage after the certain period of time.

5. The power control device of claim 1, wherein:
   when the boot-up enable signal is activated, the power supply circuit and the power driving circuit are turned on for a certain period of time when the control signal is activated and apply the first driving voltage with the level of the power supply voltage; and
   the power driving circuit is turned on when the control signal is deactivated after the certain period of time and supplies the second driving voltage with a lower level than the power supply voltage.

6. The power control device of claim 1, wherein:
   when the control signal is activated, the power supply circuit is turned on and drives the driving voltages with the level of the power supply voltage; and
   when the control signal is deactivated, the power supply circuit is turned off and blocks the supply of the power supply voltage.

7. The power control device of claim 1, wherein the power supply circuit comprises:
   a first inverter configured to invert the control signal; and
   a PMOS transistor coupled between a terminal for applying the power supply voltage and a terminal for outputting the driving voltages, and wherein an output signal of the first inverter is applied to a gate terminal of the PMOS transistor.

8. The power control device of claim 1, wherein the power driving circuit comprises a low drop output regulator configured to lower the power supply voltage and output the lowered power supply voltage.

9. The power control device of claim 1, wherein the power control circuit configured to generate the control signal in response to a power-up signal and the clock signal.

10. The power control device of claim 9, wherein the power control circuit activates the control signal after a lapse of a certain time since the power-up signal is activated and deactivates the control signal after a lapse of a certain time since the clock signal is activated.

11. The power control device of claim 9, wherein the power control circuit comprises:
   a counter configured to output a reset signal by counting the clock signal; and
   a latch circuit configured to output the control signal by storing the power-up signal.

12. The power control device of claim 11, wherein the counter activates the reset signal when a predetermined number of the clock signals toggle.

13. The power control device of claim 11, wherein the latch circuit comprises:
   a plurality of inverters configured to delay the power-up signal without inverting the power-up signal;
   a first NAND gate configured to output the control signal by performing NAND operation on an output signal of the plurality of inverters and a first output signal; and
   a second NAND gate configured to output the first output signal by performing NAND operation on the control signal and the reset signal.

14. A power control method, comprising:
   activating a control signal after a certain period of time since a power-up signal is activated;
   activating a boot-up enable signal for booting up an electrical fuse circuit;
   turning on a power supply circuit and a power driving circuit when the control signal is activated so that a first driving voltage for driving the electrical fuse circuit is driven with a level of a power supply voltage; and
   turning off the power supply circuit and maintaining the turning-on of the power driving circuit when the control signal is deactivated so that a second driving voltage is driven with a lower level than the power supply voltage.

15. The power control method of claim 14, wherein the boot-up enable signal is activated when the level of the power supply voltage reaches a predetermined target level after a power-up operation.

16. The power control method of claim 14, wherein, when the control signal is deactivated, the power supply circuit is turned off and blocks the supply of the power supply voltage.

17. The power control method of claim 14, further comprising:
   booting up the ARE circuit when the boot-up enable signal is activated; and
   outputting a clock signal when the electrical fuse circuit boots up.

18. The power control method of claim 17, further comprising:
   outputting a reset signal by counting the clock signal; and
   outputting the control signal by storing the power-up signal.

19. The power control method of claim 18, further comprising activating the reset signal when a predetermined number of the clock signals toggle.

20. The power control method of claim 18, further comprising deactivating the control signal in response to the reset signal.

* * * * *